United States Patent [19]

Naudet

[11] 4,440,974

[45] Apr. 3, 1984

[54] ELECTROMECHANICAL CABLE FOR WITHSTANDING HIGH TEMPERATURES AND PRESSURES, AND METHOD OF MANUFACTURE

[75] Inventor: Jacques Naudet, Rueil Malmaison, France

[73] Assignee: Les Cables de Lyon, Rueil Malmaison, France

[21] Appl. No.: 388,818

[22] Filed: Jun. 16, 1982

[30] Foreign Application Priority Data

Jun. 18, 1981 [FR] France ............................. 81 11992

[51] Int. Cl.³ .............................................. H01B 9/02
[52] U.S. Cl. ..................... 174/108; 174/36; 174/106 R; 174/106 SC; 174/110 S; 174/116
[58] Field of Search .................... 174/105 SC, 106 SC, 174/106 R, 108, 110 S, 116

[56] References Cited

U.S. PATENT DOCUMENTS

| | | | |
|---|---|---|---|
| 2,604,509 | 7/1952 | Blanchard | 174/108 |
| 3,047,448 | 7/1962 | Feller et al. | 174/110 S |
| 3,162,722 | 12/1964 | Bartos | 174/110 S |
| 3,602,632 | 8/1971 | Ollis | 174/108 X |
| 3,679,812 | 7/1972 | Owens | 174/108 |
| 3,784,732 | 1/1974 | Whitfill, Jr. | 174/108 |
| 3,840,393 | 10/1974 | Ishizaka et al. | 174/110 S X |
| 3,936,572 | 2/1976 | MacKenzie, Jr. et al. | 174/110 S X |
| 4,317,000 | 2/1982 | Ferer | 174/108 X |
| 4,317,002 | 2/1982 | Spicer | 174/113 R X |

FOREIGN PATENT DOCUMENTS 1438610  6/1976  United Kingdom .
1602372 11/1981  United Kingdom .

Primary Examiner—J. V. Truhe
Assistant Examiner—Morris H. Nimmo
Attorney, Agent, or Firm—Sughrue, Mion, Zinn, Macpeak and Seas

[57] ABSTRACT

An electromechanical cable capable of withstanding high pressures and temperatures of at least 200° C., the cable comprising a core having a plurality of insulated conductors (3,5) covered with a conductive filler (7) which fills the voids between the conductors, the core being surrounded by a layer of conductive textile material (8) and by at least one layer of helically wound metal armor wire (9,10). The filler is a composite material comprising a silicone polymer with a semiconductor charge of carbon black.

5 Claims, 2 Drawing Figures

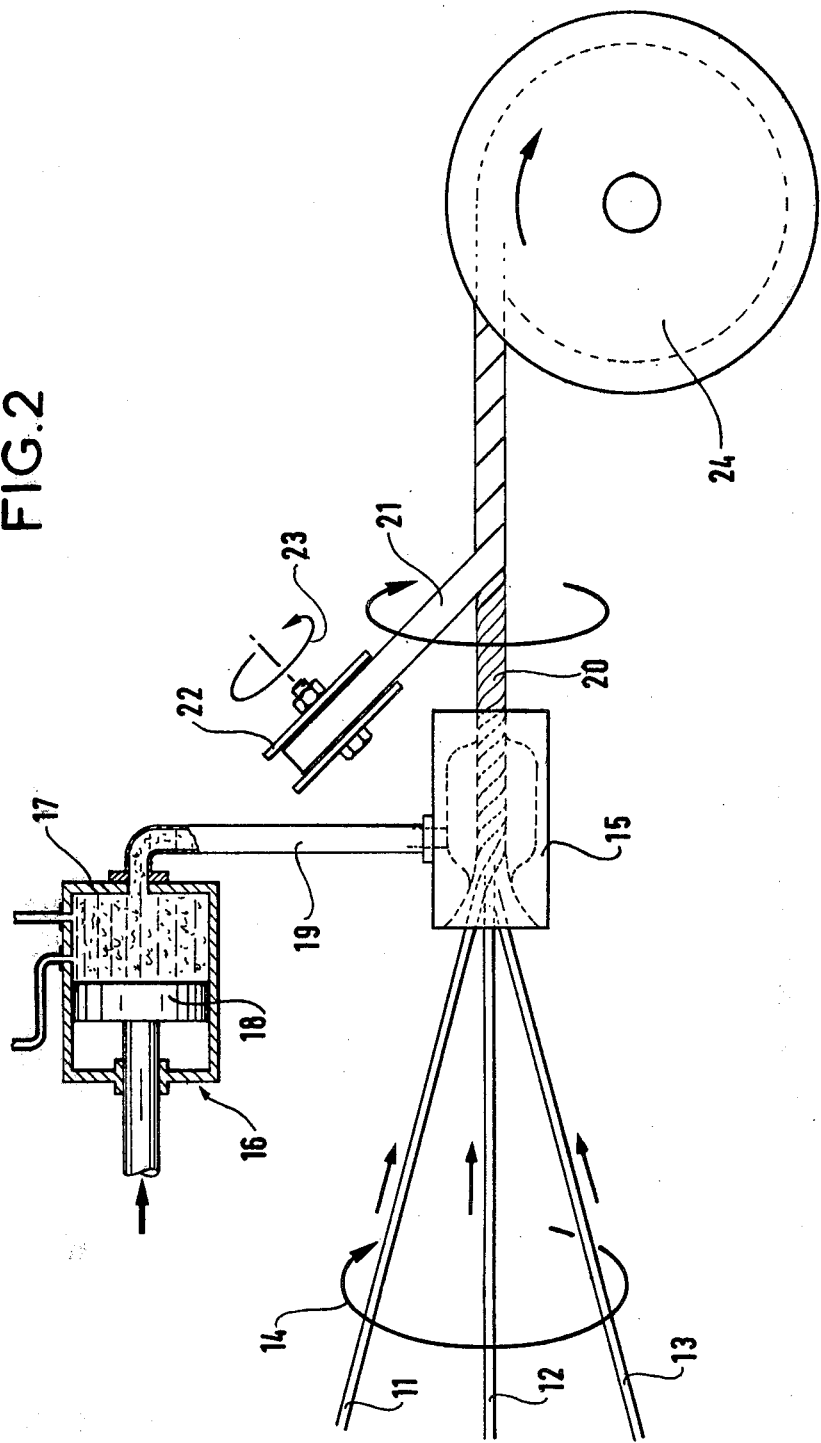

ELECTROMECHANICAL CABLE FOR WITHSTANDING HIGH TEMPERATURES AND PRESSURES, AND METHOD OF MANUFACTURE

The present invention relates to an electromechanical cable capable of withstanding temperatures of at least 200° C. and high pressures of several hundred atmospheres. The cable comprises a plurality of insulated conductors covered with a conductive filler which fills the voids between the conductors, the assembly is then surrounded by a layer of conductive textile material and finally by at least one layer of helically wound metal armor wire.

BACKGROUND OF THE INVENTION

Such cables are used in particular when drilling for oil, and in service they are subjected to very severe stresses due both to the pressure exerted by the layers of rock through which the cable passes, and also to the high temperatures which are due in part to the natural increase of temperature with depth, and in part to the heat generated by the drilling work.

There is now a requirement for cables that are capable of withstanding service temperatures higher than 200° C., and even higher than 220° C., and pressures of several hundred atmospheres.

Single conductor insulants capable of withstanding such service conditions are already known, for example: polymethylpentene as claimed in the present Assignee's published French patent application No. 2,472,823; ethylene or propylene polyfluoride; and the copolymer of ethylene and tetrafluroethylene.

In contrast, fillers that perform satisfactorily under such circumstances are not known. In this context, satisfactory performance includes uniform distribution of potential inside the cable, adequate stability at the high temperatures encountered, and satisfactory manufacturing properties.

Furthermore, such fillers are called on to be elastic and to oppose deformation of the insulants under the effect of mechanical and thermal stress.

In particular, a composite of polyethylene tetrasulphide charged with carbon black cannot withstand temperatures above 150° C. The carbon black is used to provide electrical shielding, uniform distribution of potential around the different conductors, and to evacuate static charges that might otherwise disturb measurements.

Preferred embodiments of the present invention thus provide an electromechanical cable capable of withstanding at least 200° C., and preferably 220° C., at pressures of several hundred atmospheres.

SUMMARY OF THE INVENTION

The present invention provides an electromechanical cable capable of withstanding high pressures and temperatures of at least 200° C., the cable comprising a core having a plurality of insulated conductors covered with a conductive filler which fills the voids between the conductors, the core being surrounded by a layer of conductive textile material and by at least one layer of helically wound metal armour wire, wherein the filler is a composite material comprising a silicone polymer with a semiconductor change of carbon black.

Preferably, the cable has at least one of the following features:

the silicone polymer is a diorganonpolysiloxane;

the carbon black is in the form of particles having a specific surface area that is at least equal to 150 m$^2$/g (ie. square meters per gram);

the filler comprises 30 to 50 parts by weight carbon black per 100 parts silicone; and the conductors are insulated with polymethylpentene.

The invention also provides a method for manufacturing a cable as defined above. The method comprises preparing a filler mixture of liquid silicone, carbon black and a reticulation agent for reticulating the silicone, said mixture having a viscosity of less than 10,000 poises at 20° C.; assembling insulated conductors to constitute the core of the cable by passing said insulated conductors through a die; filling the voids between the insulated conductors of the core by injecting the filler into said die; winding a conductive textile tape around the assembled cable core before said filler mixture reticulates; allowing said filler mixture to reticulate after said tape is in place; and winding steel wire armor around the reticulated core.

The filler mixture is preferably reticulated by heating the cable core with its surrounding textile tape in an oven to a temperature greater than 100° C. and for a period of several days.

BRIEF DESCRIPTION OF THE DRAWINGS

A cable in accordance with the invention and its method of manufacture are described by way of example with reference to the accompanying drawings, in which:

FIG. 2 is a diagram of apparatus for manufacturing the cable core.

MORE DETAILED DESCRIPTION

Figure 1:
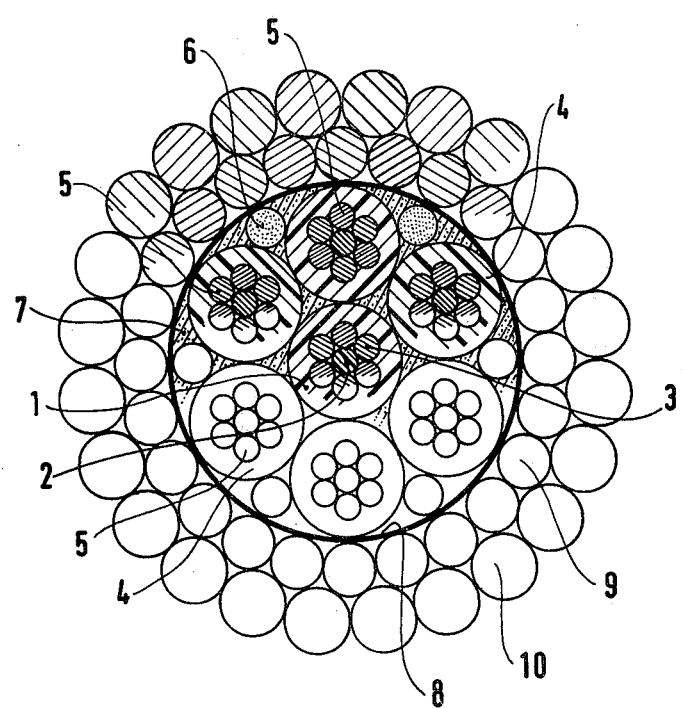
FIG. 1 is a cross section through a cable.

In a FIG. 1, it can be seen that a cable comprises a central strand 1 surrounded by six similar outer strands 4. The central strand comprises a central insulating fibre 2, e.g. of polyester, surrounded by six copper wires 3 wound helically about the central fibre. The outer strands are made up with seven twisted wires 5. All the strands are insulated by a coating of polymethylpentene, or some other high temperature insulant. Each of the seven strands 1 and 4 are covered with a semiconductor varnish based on armorphous carbon or graphite for passing static charges which could produce disturbing discharges if allowed to accumulate. Filler strands 6 of textile material covered in semiconductor varnish occupy the outer interstices between pairs of adjacent outer strands 4.

The entire above-described assembly is potted in filler material 7 comprising 100 parts by weight diorganopolysiloxane and 30 to 50 parts carbon black made from 24 micron diameter particles giving a specific surface area of 179 m$^2$/g. This material has a Shore A hardness of at least 40, a breaking stress of at least 4.5 N/mm$^2$, and electrical resistivity of not more than 500 ohm-cm. The resulting cable core is surrounded by a textile tape 8 made of polyester or an aromatic polyamide, or of fibre glass. The tape is made conductive by being impregnated with a conductive dressing. The taped core is covered by two layers of high strength steel wire armor 9,10; said layers being wound in opposite directions about said core.

In FIG. 2, only three strands 11, 12 and 13 are shown, for the sake of clarity in the drawing. In fact, all seven conductor strands together with the filler strands move forwards together into a die 15 (as shown by three individual arrows), and the entire set of strands rotates as shown by a rotation arrow 14. The die 15 is connected to an injector 16 for injecting liquid silicone charged with carbon black and a reticulation catalyst, eg. dicumyl peroxide or benzoyl peroxide. The injector is represented schematically by a cylinder 17 with a piston 18 for pushing a liquid mixture under a pressure of several atmospheres into a duct 19 leading to the die 15.

At the outlet from the die 15, the core of twisted strands covered with liquid silicone is surrounded by a textile tape 21 made of polyester, fibre glass or an aromatic polyamide. The tape is wound into position by a reel 22 rotating about the core (arrow 23) as the core moves forward onto a take-up reel 24.

When the take-up reel is full of cable core, it is heated in an oven to a temperature of more than 100° C. It is kept at this temperature for a period of two to three days to enable the semiconductor silicone to reticulate under the effect of the catalyst.

After reticulation, the filler material has the mechanical and electrical characteristics indicated above.

The core is then covered in the usual manner with two layers of steel wire armoring wound helically in opposite directions. The cable is then ready for use.

Although the electromechanical cable and its method of manufacture as described above with reference to the accompanying drawings appear to be the preferred modes of performing the invention, it will be understood that various modifications can be made thereto without going beyond the scope of the invention. In particular, it would be possible to do without the filler strands in between the outer strands 4 of the cable core. Similarly, the number of layers of steel wire used in the armoring depends on the mechanical strength required for the cable. The number of conductor wires and/or insulator fibres in each strand may also be modified.

I claim:

1. An electromechanical cable capable of withstanding high pressures and temperatures of at least 200° C., the cable comprising a core having a plurality of insulated conductors covered with a conductive filler which fills the voids between the conductors, the core being surrounded by a layer of conductive textile material and by at least one layer of helically wound metal armor wire, the improvement wherein the filler is a composite material consisting essentially of a silicone polymer with a semiconductor charge of carbon black.

2. A cable according to claim 1, wherein the silicone polymer is a diorganonpolysiloxane.

3. A cable according to claim 1, wherein the carbon black is in the form of particles having a specific surface area that is at least equal to 150 $m^2/g$.

4. A cable according to claim 1, wherein the filler comprises 30 to 50 parts by weight carbon black per 100 parts silicone polymer.

5. A cable according to claim 1, wherein the conductors are stranded and each one is insulated with polymethylpentene.

* * * * *